Patented June 24, 1947

2,422,679

UNITED STATES PATENT OFFICE 2,422,679

PROCESS FOR PREPARING ENOL ESTERS OF ALDEHYDES

David C. Hull, Oak Ridge, and Albert H. Agett, Kingsport, Tenn., assignors to Eastman Kodak Company, Rochester, N. Y., a corporation of New Jersey No Drawing. Application October 3, 1945, Serial No. 620,166

10 Claims. (Cl. 260—494)

This invention relates to a process for preparing $\alpha,\beta$-unsaturated carboxylic esters.

It is known that $\alpha,\beta$-unsaturated esters can be prepared by adding a carboxylic acid to acetylene or to monoalkyl acetylenes, in the presence of a mercury salt catalyst. Thus, acetic acid adds to acetylene to give vinyl acetate, and adds to methyl-acetylene to give isopropenyl acetate. Likewise, it is known that ketene can be reacted with ketones to produce isoalkenyl acetates of the type of isopropenyl acetate. See Gwynn and Degering, Jour. Am. Chem. Soc. 64, 2216 (1942).

Staudinger, Ann. 384, 86 (1911) reported the formation of $\beta$-lactones when substituted ketenes, such as diphenyl ketene, acted upon aldehydes or ketones, and Kung, United States Patent 2,356,459, dated August 22, 1944, has shown that ketene and substituted ketenes can be made to react upon saturated aldehydes and saturated ketones to produce $\beta$-lactones in the presence of a Friedel-Crafts type of catalyst.

Staudinger, supra, also reported that diphenyl ketene reacted with acetaldehyde to produce an enol acetate (vinyl diphenylacetate).

We have now found that even simple ketene ($CH_2=C=O$) will react with certain aldehydes containing at least one hydrogen atom on the carbon atom adjacent to the aldehyde (—CHO) group to give $\alpha,\beta$-unsaturated acetates, if an acid is employed as catalyst instead of a salt, such as Friedel-Crafts type of catalyst. Moreover, even in the case of substituted ketenes, e. g. diphenyl ketene, we have found that the formation of unsaturated esters is considerably accelerated, in the presence of an acid catalyst.

In our new process, two cometing reactions take place simultaneously, the one resulting in the formation of $\alpha,\beta$-unsaturated carboxylic esters and the other resulting in the formation of $\alpha,\beta$-unsaturated ketones. In some cases the reaction producing the $\alpha\beta,$-unsaturated carboxylic acid predominates, while in other cases, the reaction producing the $\alpha,\beta$-unsaturated ketone predominates.

The unsaturated esters obtainable in accordance with our new process are alkenyl carboxylic esters of the type of propenyl acetate and 1-butenyl acetate rather than of the isoalkenyl type obtained according to the aforesaid prior processes.

It is, accordingly, an object of our invention to provide a process for preparing $\alpha,\beta$-unsaturated carboxylic esters. A further object is to provide unsaturated esters heretofore unavailable. Other objects will become apparent hereinafter.

In accordance with our invention, we prepare $\alpha,\beta$-unsaturated carboxylic esters by reacting a ketene with an aldehyde which contains at least two carbon atoms and which does not contain a conjugated system of double bonds in which the double bond of the aldehyde group is a part, and which contains at least one hydrogen atom on the carbon atom adjacent to the aldehyde group (—CHO), in the presence of an acid catalyst.

Ketene or substituted ketenes (aldoketenes and ketoketenes) can be employed in practicing our invention, e. g., simple ketene ($CH_2=C=O$) methylketene, dimethyl ketene, diethyl ketene, diphenyl ketene, etc. All of these substances are included under the term "a ketene."

Exemplary of aldehydes which contain at least two carbon atoms and which do not contain a conjugated system of double bonds in which the double bond of the aldehyde group is a part, and which do contain at least one hydrogen atom on the carbon atom adjacent to the aldehyde group (—CHO) are: acetaldehyde, propionaldehyde, n-butyraldehyde, iso-butyraldehyde, n-valeraldehyde, iso-valeraldehyde, 2-ethylbutyraldehyde, phenylacetaldehyde, etc., The aldehydes containing at least two hydrogen atoms on the carbon atom adjacent to the aldehyde group are especially useful in practicing our invention. Polymeric forms of the aldehydes can be employed.

Among the acid catalysts, those most advantageously employed in practicing our invention are represented by the following general formula:

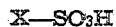

wherein X represents a monovalent non-metallic atom other than hydrogen, e. g., fluorine, chlorine or bromine, or X represents a group of atoms containing at least one polyvalent non-metallic atom other than carbon, said polyvalent atom being linked directly to the S atom of the —$SO_3H$ group, e. g. HO—, $CH_3O$—, $C_2H_5O$—, $C_3H_7O$—, $C_4H_9O$—, $H_2N$—, $(CH_3)_2N$—, $CH_3CO$-HN—, etc. Included under the acid catalysts represented by the above general formula is oleum (e. g. sulfuric acid containing from 5 to 50 percent by weight of sulfur trioxide). Still other acid catalysts can be used, e. g. phosphoric acid, p-toluenesulfonic acid, etc., but those represented by the above general formula are superior.

In preparing $\alpha,\beta$-unsaturated carboxylic esters, in accordance with our invention, the aldehyde is placed in a reaction vessel along with a small quantity of the acid catalyst. The mixture is then raised to reaction temperature and a ketene, preferably freshly prepared, is added to the mixture at a rate which substantially precludes the building up in the reaction mixture of any substantial quantity of the unreacted ketene. The dispersion of the ketene in the reaction mixture is advantageously facilitated by agitation of the reaction mixture. Agitation also aids in avoiding local over-heating of the reaction mixture. The addition of the ketene is advantageously continued until a quantity has been added which is at least as much as the molecular equivalent quantity of the aldehyde present, or until no further reaction takes place.

The ketene employed in practicing our invention can be prepared in any suitable manner. A convenient method for preparing the simplest ketene ($CH_2=C=O$) is by pyrolysis of acetone, removing the small quantity of residual acetone by passing the resulting vapors through a series of cold traps before utilizing the ketene for reaction with the aldehyde. Ketene ($CH_2=C=O$) prepared by pyrolysis of acetic acid can also be employed.

The process of our invention takes place over a wide temperature range. Usually we have found that the reaction takes place between 0 and 80° C., although temperatures outside this range can be employed. The heat of reaction may require cooling of the reaction mixture to control the temperature within the desired range.

If desired a reaction medium which is inert to the aldehyde and the ketene, e. g., a saturated aliphatic hydrocarbon (hexane, heptane, etc.) or an aromatic hydrocarbon (benzene, toluene, etc.) can be employed if desired. However, a reaction medium is unnecessary in the case of most aldehydes which are liquid at the reaction temperature employed.

The following examples will serve to illustrate further the manner of practicing our invention.

Example 1.—Vinyl acetate

Five drops of concentrated sulfuric acid (sp. g. 1.84) were added to 300 cc. of acetaldehyde. Two gram-moles of ketene ($CH_2=C=O$) were then passed into the acetaldehyde-sulfuric acid mixture, at about 15° C. The mixture was then distilled at atmospheric pressure and 35 g. of vinyl acetate boiling at 72° C. were obtained. This yield represented a 21% conversion of the acetaldehyde to vinyl acetate. A small amount of methyl propenyl ketone was also formed.

Example 2.—1-butenyl acetate (1-buten-1-ol acetate) and hepten-3-one-2

500 g. of n-butyraldehyde and 5 drops of concentrated sulfuric acid (sp. g. 1.84) were heated at gentle reflux while passing into the mixture two gram-moles of ketene ($CH_2=C=O$) through a hollow high speed stirrer which also serves to agitate the mixture. The sulfuric acid was neutralized with anhydrous sodium acetate after all the ketene was introduced. The neutralized reaction mixture was subjected to distillation and 1-butenyl acetate boiling at 123° C. at 760 mm. of Hg pressure as well as hepten-3-one-2 boiling at 60° C. at 10 mm. of Hg pressure were obtained. The 1-butenyl acetate had a density (20/20) of 0.9332 and a refractive index (20/D) of 1.4049. Upon reduction by hydrogenation in the presence of a nickel catalyst, the butenyl acetate yielded n-butyl acetate. The yields represented a 7% conversion of the butyraldehyde to butenyl acetate having the formula:

$$CH_3-CH_2-CH=CH-OCOCH_3$$

and a 51% conversion of butyraldehyde to hepten-3-one-2 having the formula:

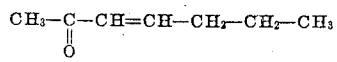

In the same manner illustrated above acetaldehyde and diphenyl ketene give vinyl diphenylacetate, propionaldehyde and ketene give propenyl acetate and hexen-3-one-2, phenylacetaldehyde and ketene give benzylidenemethyl acetate and 5-phenyl-3-penten-2-one, valeraldehyde and ketene give 1-penten-1-ol acetate and octen-3-one-2, 2-ethylbutyraldehyde and ketene gives 3-methyl-1-penten-1-ol acetate and 7-methyl-3-octen-2-one, etc.

Small amounts of water may be present in the reaction mixture without adversely affecting the process.

The proper quantity of acid employed as catalyst in our process will vary with the rate of addition of the ketene, and generally speaking an increased rate of addition requires a greater amount of acid catalyst. When operating at the most desirable rate of addition, we have found that the yield of α,β-unsaturated carboxylic ester increases slowly at about the same rate as the concentration of the catalyst employed. When high concentrations of catalyst are employed, however, the ratio of polymerization of the ketene to the formation of α,β-unsaturated carboxylic ester increases sharply, and the yield of unsaturated ester drops off sharply. The acid catalysts are usually most effective in concentrations of from 0.1 to 1.0% by weight of the aldehyde employed, although higher concentrations can be employed.

In carrying out our process the ketene can be passed counter-current to a stream of aldehyde as in a continuous process.

What we claim as our invention and desire to be secured by Letters Patent of the United States is:

1. A process for preparing an α,β-unsaturated carboxylic ester comprising reacting a ketene with an aldehyde which contains at least two carbon atoms and which does not contain a conjugated system of double bonds in which the double bond of the aldehyde group is a part, and which contains at least one hydrogen atom on the carbon atom adjacent to the aldehyde group, in the presence of an acid catalyst, and separating the α,β-unsaturated carboxylic ester from the other reaction products.

2. A process for preparing an α,β-unsaturated acetate comprising reacting ketene ($CH_2=C=O$) with an aldehyde which contains at least two carbon atoms and which does not contain a conjugated system of double bonds in which the double bond of the aldehyde group is a part, and which contains at least one hydrogen atom on the carbon atom adjacent to the aldehyde group, in the presence of an acid catalyst, and separating the α,β-unsaturated acetate from the other reaction products.

3. A process for preparing an α,β-unsaturated carboxylic ester comprising reacting a ketene with an aldehyde which contains at least two carbon atoms and which does not contain a conjugated system of double bonds in which the double bond of the aldehyde group is a part, and which contains at least one hydrogen atom on the carbon atom adjacent to the aldehyde group in the presence of an acid selected from those having the following general formula:

X—SO₃H wherein X represents a member selected from the group consisting of a monovalent non-metallic atom other than hydrogen and a group of atoms containing at least one polyvalent atom other than carbon, said polyvalent non-metallic atom being linked directly to the S atom of the —SO₃H group, and separating the α,β-unsaturated carboxylic ester from the other reaction products.

4. A process for preparing an α,β-unsaturated acetate comprising reacting ketene (CH₂=C=O) with an aldehyde which contains at least two carbon atoms and which does not contain a conjugated system of double bonds in which the double bond of the aldehyde group is not a part, and which contains at least one hydrogen atom on the carbon atom adjacent to the aldehyde group, in the presence of an acid selected from those having the following general formula:

X—SO₃H wherein X represents a member selected from the group consisting of a monovalent-non-metallic atom other than a hydrogen and a group of atoms containing at least one polyvalent atom other than carbon, said polyvalent non-metallic atom being linked directly to the S atom of the —SO₃H group, and separating the α,β-unsaturated acetate from the other reaction products.

5. A process for preparing an α,β-unsaturated acetate comprising reacting ketene (CH₂=C=O) with an aldehyde which contains at least two carbon atoms and which contains at least two hydrogen atoms on the carbon atom adjacent to the aldehyde group, in the presence of an acid selected from those having the following general formula:

X—SO₃H wherein X represents a member selected from the group consisting of a monovalent non-metallic atom other than a hydrogen and a group of atoms containing at least one polyvalent atom other than carbon, said polyvalent non-metallic atom being linked directly to the S atom of the —SO₃H group, and separating the α,β-unsaturated acetate from the other reaction products.

6. A process for preparing an α,β-unsaturated acetate comprising reacting ketene (CH₂=C=O) with an aldehyde which contains at least two carbon atoms and which does not contain a conjugated system of double bonds in which the double bond of the aldehyde group is a part, and which contains at least one hydrogen atom on the carbon atom adjacent to the aldehyde group, in the presence of sulfuric acid, and separating the α,β-unsaturated acetate from the other reaction products.

7. A process for preparing an α,β-unsaturated acetate comprising reacting ketene (CH₂=C=O) with an aldehyde which contains at least two carbon atoms and which contains at least two hydrogen atoms on the carbon atom adjacent to the aldehyde group, in the presence of sulfuric acid, and separating the α,β-unsaturated acetate from the other reaction products.

8. A process for preparing vinyl acetate comprising reacting ketene (CH₂=C=O) with acetaldehyde, in the presence of sulfuric acid, and separating the vinyl acetate from the other reaction products.

9. A process for preparing propenyl acetate comprising reacting ketene (CH₂=C=O) with propionaldehyde, in the presence of sulfuric acid, and separating the propenyl acetate from the other reaction products.

10. A process for preparing 1-buten-1-ol acetate comprising reacting ketene (CH₂=C=O) with n-butyraldehyde, in the presence of sulfuric acid, and separating the 1-buten-1-ol acetate from the other reaction products.

DAVID C. HULL.
A. H. AGETT.

REFERENCES CITED

The following references are of record in the file of this patent:

UNITED STATES PATENTS

| Number | Name | Date |
|---|---|---|
| 2,383,965 | Gwynnet et al. | Sept. 4, 1945 |
| 2,383,137 | Lecher et al. | Aug. 21, 1945 |
| 2,330,570 | Filachione | Sept. 28, 1943 |
| 2,108,427 | Boese | Feb. 15, 1938 |
| 2,021,698 | Perkins | Nov. 19, 1935 |

OTHER REFERENCES

Kirrmann, "Bulletin de la societe chimique de France," vol. 5 (1938), pps. 915 to 919.
"Chem. Abstracts," vol. 38 (1944), page 5199.